US007357303B2

(12) United States Patent

Taniyama et al.

(10) Patent No.: US 7,357,303 B2

(45) Date of Patent: Apr. 15, 2008

(54) BILL HANDLING APPARATUS

(75) Inventors: Yukie Taniyama, Nagoya (JP); Yukihiro Taninaka, Owariasahi (JP)

(73) Assignee: Hitachi-Omron Terminal Solutions, Corp., Tokyo (JP)

( * ) Notice: Subject to any disclaimer, the term of this patent is extended or adjusted under 35 U.S.C. 154(b) by 246 days.

(21) Appl. No.: 10/879,271

(22) Filed: Jun. 30, 2004

(65) Prior Publication Data

US 2005/0023341 A1 Feb. 3, 2005

(30) Foreign Application Priority Data

Jul. 29, 2003 (JP) ............................ 2003-202763

(51) Int. Cl.

| | |
|---|---|
| ***G06Q 40/00*** | (2006.01) |
| ***G07D 11/00*** | (2006.01) |
| ***G07F 19/00*** | (2006.01) |
| ***G06K 5/00*** | (2006.01) |
| ***G06F 17/00*** | (2006.01) |

(52) U.S. Cl. ...................... 235/379; 235/375; 235/380; 902/8; 902/12

(58) Field of Classification Search ................ 235/379, 235/380, 375; 194/206, 217, 265.01; 271/176; 902/8, 11-13; 209/534

See application file for complete search history.

(56) References Cited

U.S. PATENT DOCUMENTS

| | | | | | |
|---|---|---|---|---|---|
| 3,845,848 | A | * | 11/1974 | Robbins | 194/206 |
| 3,976,198 | A | * | 8/1976 | Carnes et al. | 209/534 |
| 4,443,692 | A | * | 4/1984 | Nishimura | 235/379 |
| 4,532,417 | A | * | 7/1985 | Nishimura et al. | 235/379 |
| 4,538,057 | A | * | 8/1985 | Iwagami et al. | 235/379 |
| 4,540,081 | A | * | 9/1985 | Mori et al. | 194/207 |
| 4,638,434 | A | * | 1/1987 | Aizaki | 705/43 |
| 4,678,072 | A | * | 7/1987 | Kobayashi et al. | 194/206 |
| 4,707,843 | A | * | 11/1987 | McDonald et al. | 377/8 |
| 4,809,966 | A | * | 3/1989 | Kobayashi et al. | 271/181 |
| 4,880,096 | A | * | 11/1989 | Kobayashi et al. | 194/206 |
| 4,905,840 | A | * | 3/1990 | Yuge et al. | 209/534 |
| 4,928,230 | A | | 5/1990 | Yamauchi | |
| 4,972,958 | A | * | 11/1990 | Ito et al. | 209/534 |
| 4,980,543 | A | * | 12/1990 | Hara et al. | 235/379 |
| 5,076,413 | A | * | 12/1991 | Davila et al. | 194/206 |

(Continued)

FOREIGN PATENT DOCUMENTS

| | | |
|---|---|---|
| EP | 0 967 581 | 12/1999 |

(Continued)

*Primary Examiner*—Daniel Walsh

(74) *Attorney, Agent, or Firm*—Antonelli, Terry, Stout & Kraus, LLP.

(57) ABSTRACT

When using an inexpensive deposit box in a provided bill handling apparatus, bills that can be deposited are increased irrespective of a limit in the number of bills that can be stacked in the deposit box. In a bill handling apparatus including a bill deposit/withdrawal port for depositing/withdrawing bills, a bill discrimination section for discriminating bills, a temporary storage box for temporarily storing bills, a deposit box for accepting reject bills and bills other than pertinent bill kinds, bill acceptance boxes for accepting the pertinent bill kinds, bill transport paths for transporting bills, and a main control section for controlling the whole apparatus, the number of bills that can be deposited is increased by providing a section for counting bills transported to the deposit box and a section for temporarily stopping bill separation from the temporary storage box.

14 Claims, 6 Drawing Sheets

U.S. PATENT DOCUMENTS 5,247,159 A * 9/1993 Yuge et al. ................. 235/379
5,553,320 A * 9/1996 Matsuura et al. ........... 235/379
5,692,067 A * 11/1997 Raterman et al. ........... 382/135
5,909,814 A * 6/1999 Arikawa ..................... 209/534
6,000,521 A * 12/1999 Jung .......................... 194/206
6,000,555 A * 12/1999 Anma ........................ 209/534
6,437,356 B1 * 8/2002 Yasuda et al. ........... 250/559.4
6,637,647 B2 * 10/2003 Katou et al. ................ 235/379
6,659,258 B2 * 12/2003 Otsuka ....................... 194/206
6,659,340 B2 * 12/2003 Siemens ..................... 235/379
6,679,368 B2 * 1/2004 Ishida et al. ................ 194/217
6,695,119 B2 * 2/2004 Yamamoto .................. 194/206
6,827,347 B2 * 12/2004 Ito et al. ..................... 271/222
6,971,573 B2 * 12/2005 Fujioka ...................... 235/379
2001/0013456 A1 * 8/2001 Ishida et al. ................ 194/217
2001/0019965 A1 * 9/2001 Ochi ........................... 463/25
2001/0054643 A1 * 12/2001 Siemens ..................... 235/379
2002/0008138 A1 * 1/2002 Yamauchi et al. .......... 235/379
2002/0088850 A1 * 7/2002 Katou et al. ................ 235/379
2002/0126886 A1 9/2002 Jones
2002/0153290 A1 * 10/2002 Otsuka ....................... 209/534
2003/0137096 A1 * 7/2003 Ito et al. ..................... 271/176
2003/0173402 A1 * 9/2003 Ogawa et al. .............. 235/381
2004/0011622 A1 * 1/2004 Omori et al. ............... 194/230
2004/0256450 A1 * 12/2004 Fujioka ...................... 235/379
2005/0023341 A1 * 2/2005 Taniyama et al. ........... 235/379
2006/0081509 A1 * 4/2006 Otsuka ....................... 209/534
2007/0114717 A1 * 5/2007 Taniyama .............. 271/265.01

FOREIGN PATENT DOCUMENTS

JP 11-175801 7/1999

* cited by examiner

BILL HANDLING APPARATUS

INCORPORATION BY REFERENCE

The present application claims priority from Japanese application JP 2003-202763 filed on Jul. 29, 2003, the content of which is hereby incorporated by reference into this application.

BACKGROUND OF THE INVENTION

The present invention relates to a bill handling apparatus or an automated teller machine (ATM) used in banking organizations and so on. In particular, the present invention relates to a bill handling apparatus having an inexpensive dedicated deposit box, which makes possible deposit acceptance of a variety of bills.

Conventionally, as an apparatus installed in banking organizations and so on to automatically execute transactions desired by customers, there is an automated teller machine (ATM). This ATM is also called bill handling apparatus or bill deposit/withdrawal apparatus because it handles mainly bills, and it is described in JP-A-11-175801. JP-A-11-175801 discloses a versatile, simple, small-sized, low cost bill deposit/withdrawal apparatus capable of easily coping with foreign bills and so on differing in bill size, in determination of the number of bill kinds, determination whether recycle is present in each bill kind, or determination whether high function operation of loading, recovery and examination is present.

In general, in a bill handling apparatus or bill deposit/withdrawal apparatus that handles a variety of bills, the apparatus itself must be made small in size. On the other hand, an apparatus capable of handling many bills is desirable from the viewpoint of efficiency improvement in the various transactions. As a result, the number of bills accepted in acceptance boxes placed within the apparatus is also very large. Attention is paid to this point in JP-A-11-175801 as well. However, there is no disclosure as regards to various problems that must be considered in a deposit transaction of accepting bills thrown into a deposit port by a customer into acceptance boxes installed within the apparatus.

For example, for accepting bills deposited by a customer in the apparatus, a dedicated deposit box for accepting the bills become necessary. As described above, it is desirable to accept a large number of bills. On the other hand, an inexpensive deposit box having a simple configuration is desirable. And it is not sufficient to only install such a deposit box in the apparatus, but it is necessary to control the inside of the apparatus while managing bills accepted in the deposit box.

SUMMARY OF THE INVENTION

An object of the present invention is to provide a bill handling apparatus suitable for transporting bills into a deposit box limited in number of accepted bills because of its mechanical structure (its simple structure).

Another object of the present invention is to provide a highly reliable bill handling apparatus that does not cause a jam in each deposit transaction.

Still another object of the present invention is to provide inexpensive deposit boxes together with a bill handling apparatus that makes possible a deposit transaction using a large number of bills.

In order to achieve at least one of the objects, the present invention provides a bill handling apparatus or a bill deposit/withdrawal apparatus including stop means for temporarily stopping bill feeding operation (or bill separation operation) from a temporary storage box on the basis of the number of bills, when transporting bills from the temporary storage box, which temporarily stores bills deposited from a deposit/withdrawal port, to acceptance boxes.

Other objects, features and advantages of the invention will become apparent from the following description of the embodiments of the invention taken in conjunction with the accompanying drawings.

DESCRIPTION OF THE EMBODIMENTS

Hereafter, a bill handling apparatus (or bill deposit/withdrawal apparatus) included in an automated teller machine will be described as embodiments of the present invention with reference to the drawings.

Figure 1:
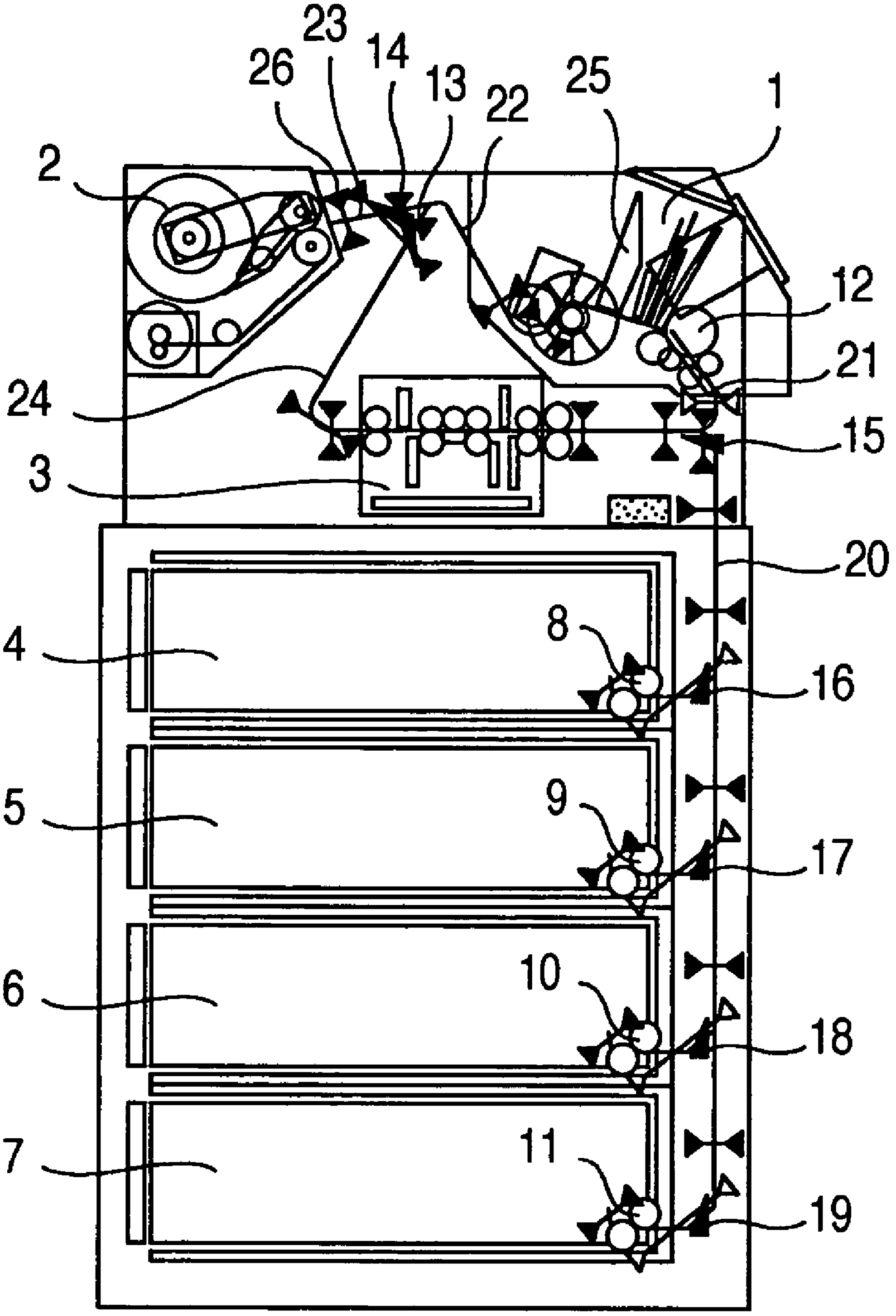
FIG. 1 is a schematic diagram of a bill handling apparatus.
Figure 2A:
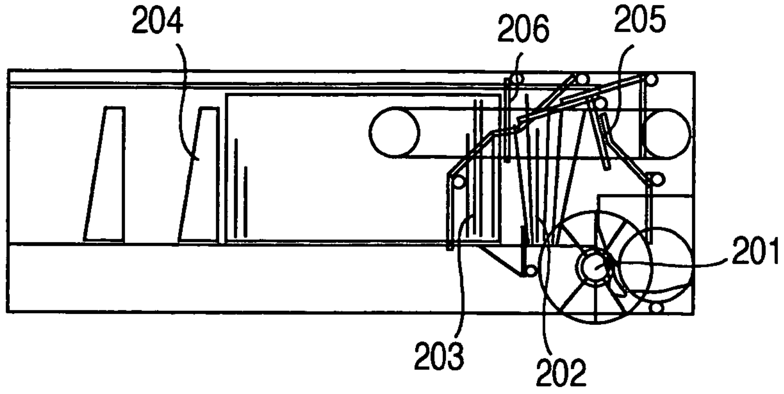
FIGS. 2A and 2B are schematic diagrams showing a deposit operation of a deposit box.
Figure 2B:
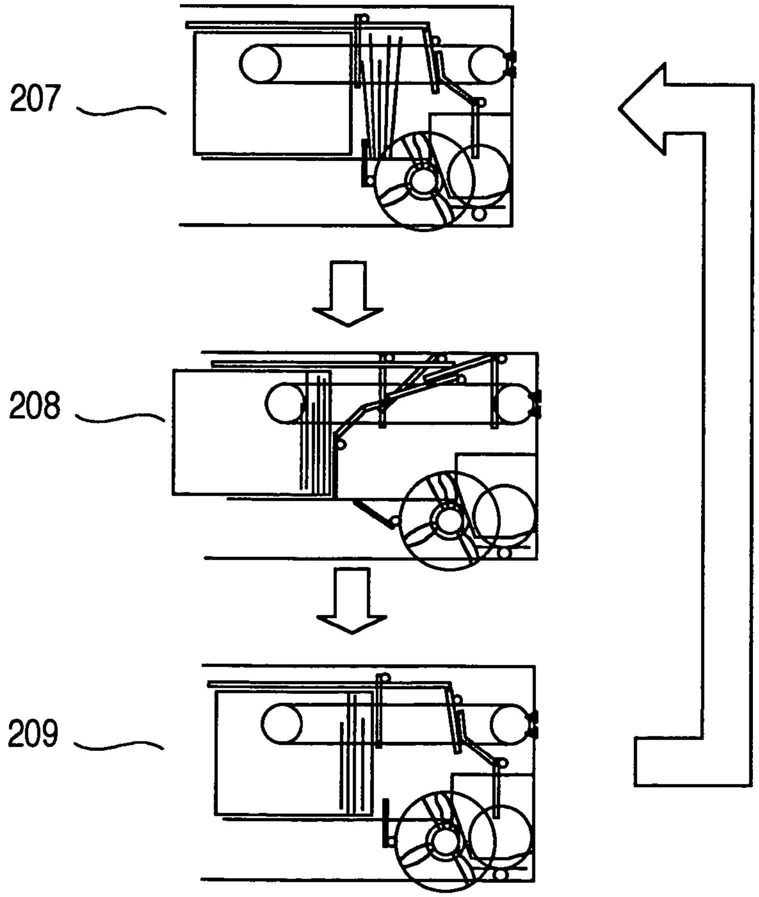
Figure 3:
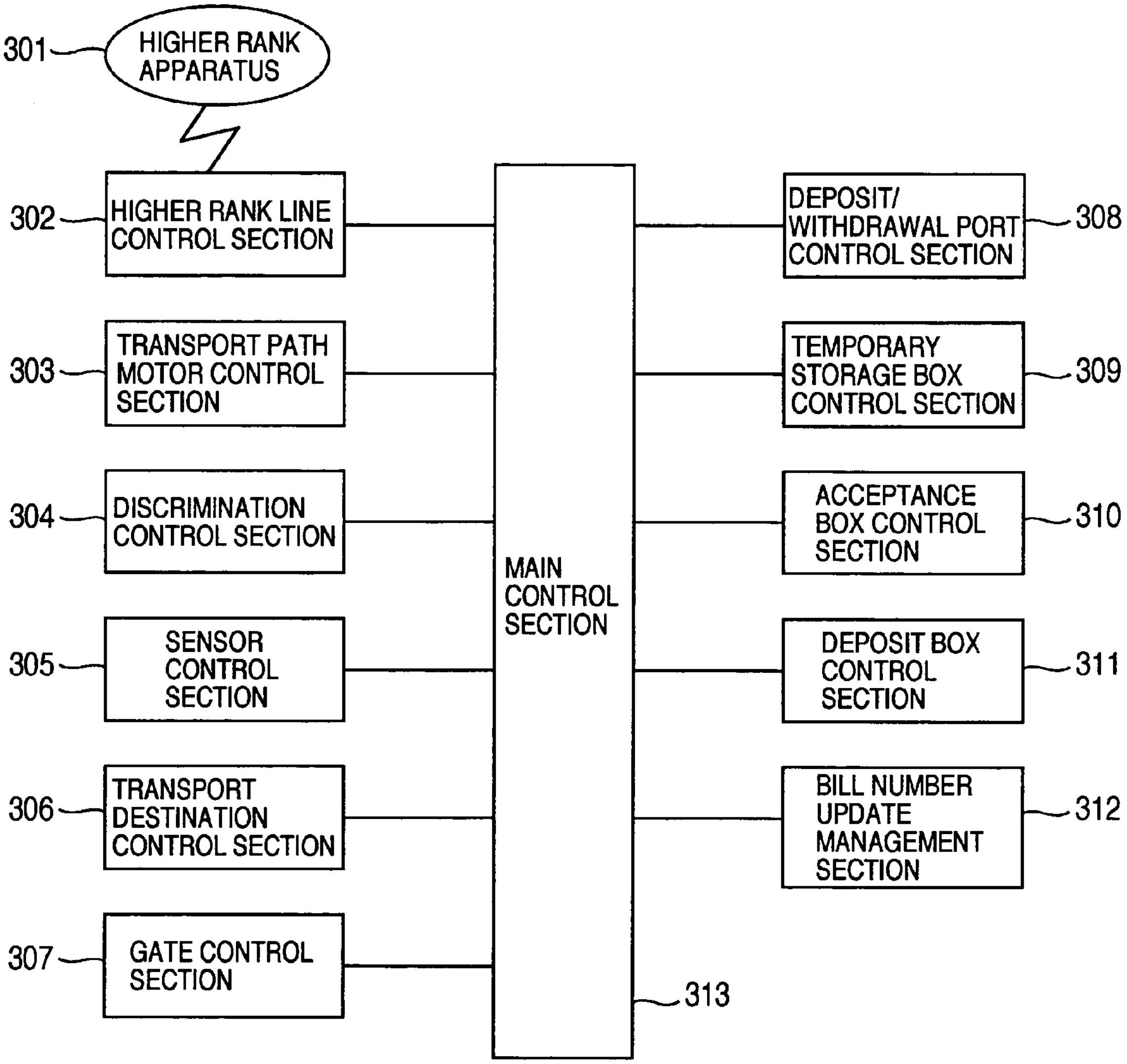
FIG. 3 is a diagram showing control blocks in a bill handling apparatus.

First, FIG. 1 is a schematic diagram of a bill handling apparatus including inexpensive deposit boxes each having a simple structure. FIGS. 2A and 2B are diagrams respectively showing a detailed structure of a deposit box and its schematic operation. FIG. 3 is a diagram showing control blocks in the bill handling apparatus shown in FIG. 1.

In FIG. 1, numeral 1 denotes a deposit/withdrawal port into which bills are thrown by a customer or from which bills are returned to a customer. Numeral 2 denotes a temporary storage box for temporarily winding bills and storing bills. Numeral 3 denotes a discrimination section for determining whether a bill is genuine and whether a bill is damaged and discriminating the kind and transport state of the bill. Numerals 5 to 7 denote acceptance boxes for accepting deposit bills of the pertinent bill kinds or accepting withdrawal bills of the pertinent bill kinds. Numeral 4 denotes a deposit box for accepting reject bills rejected by the discrimination section and bills that cannot be accepted in the acceptance boxes 5 to 7.

Numeral 8 denotes an acceptance section installed in the deposit box 4 to accept (or stack) bills from a transport path. Numerals 9 to 11 denote separation and acceptance sections respectively installed in the acceptance boxes 5 to 7 to separate or accept (stack) bills in the acceptance box. Numeral 12 denotes a separation section for separating bills in the deposit/withdrawal port 1. The deposit/withdrawal port 1 further includes a partition plate 25. The partition plate 25 serves as a partition between bills thrown (set) in from the outside, i.e., by the customer and bills transported from the inside of the apparatus. Numerals 13 to 19 denote gates for switching the transport direction of bill, and numerals 20 to 24 denote transport paths for transporting bills. A plurality of sensors for detecting and monitoring bills are disposed on each transport path. Especially, a sensor 26 is a sensor for detecting bill separation from the temporary storage box 2 or bill acceptance in the temporary storage box 2.

FIG. 2A is a diagram showing details of the deposit box 4. Numeral 201 denotes a sheet roller for accepting bills transported from the transport path in the deposit box 4, 202 a stack section for temporarily stacking bills, 203 an acceptance section for accepting bills, and 204 a push plate for holding down bills so as to prevent bills from falling down. Numeral 205 denotes a pusher for moving bills stored in the stack section 202 to the acceptance section 203. Numeral 206 denotes a guide for separating the stack section 202 from the acceptance section 203. This guide prevents bills in the stack section and bills in the acceptance section from falling.

This deposit box 4 is desired to be inexpensive and have a simple structure. Therefore, the push plate 204 pushes in the right direction in FIG. 2A (to the stack section 202 side) with predetermined force due to a spring, which is not illustrated. This push pressure is supported by the guide 206. Although bills accepted in the acceptance section 203 are accepted in the standing state as illustrated, the bills are interposed between the push plate 204 and the guide 206 and are accepted in order. On the other hand, it is necessary to have already accepted bills and bills that are being accepted mixedly in the space of the stack section 202 although temporarily. And the bills are in the standing state. Therefore, a space within a range predetermined so as not to hinder bills coming in the space is desirable. If the space of the stack section 202 is made very wide, then already accepted bills fell to the side of bills accepted from the sheet roller 201, and a jam caused by collision between bills occurs in the stack section 202. That is the reason. On the contrary, if the space of the stack section 202 is made very narrow, then the number of bills accepted at a time from bills transported on the transport path becomes small, resulting in a poor efficiency. In various studies, a form that prevents the already accepted bills in the standing state from hindering the bills in the stack has been considered. As a result, it is desirable that the space of the stack section 202 has a range capable of securing approximately 100 bills in the standing state.

Subsequently, acceptance operation of the deposit box 4 will now be described with reference to FIG. 2B. Bills to be stacked in the deposit box 4 are stacked in the stack section 202 one after another by rotation operation of the sheet roller 201 (step 207). After all bills to be stacked in the deposit box 4 have been stacked, the guide 206 is opened and bills are pushed from the stack section 202 to the acceptance section 203 by the pusher 205 (step 208). Thereafter, the guide 206 and the pusher 205 are returned to their original initial positions, and the stack region of the stack section 202 is secured so as to be able to conduct new stacking (step 209). Acceptance in the deposit box 4 is executed by repetition of the steps 207 to 209.

FIG. 3 is a diagram showing control blocks in the bill handling apparatus shown in FIG. 1. Numeral 301 denotes a higher rank apparatus, which orders the bill handling apparatus to conduct deposit or withdrawal. Specifically, the higher rank apparatus means a host or server connected to a control section of the automated teller machine or to the automated teller machine via a line. Numeral 302 denotes a higher rank line control section, which serves as an interface for connecting the higher rank apparatus 301 to the bill handling apparatus and executes transmission and reception of various data with the higher rank apparatus 301. Numeral 303 denotes a transport path motor control section for driving belts and rollers included in the transport paths 20 to 24. Numeral 304 denotes a discrimination control section for controlling the discrimination section 3, which determines whether a bill is genuine and whether a bill is damaged and discriminates the kind and transport state of the bill. Numeral 305 denotes a sensor control section for controlling passage sensors installed on the transport paths to detect passage of bills, and sensors, such as the sensor 26, installed in the deposit box 4, the acceptance boxes 5, 6 and 7 and the temporary storage box 2 to detect remaining bills. Numeral 306 denotes a transport destination control section for determining the transport destination (or acceptance destination) of bills on the basis of a result obtained by the discrimination control section 304. Numeral 307 denotes a gate control section for controlling the gates 13 to 19 to switch the transport destination on the basis of information supplied from the transport destination control section 306. Numeral 308 denotes a deposit/withdrawal port control section for controlling the deposit/withdrawal port 1. Numeral 309 denotes a temporary storage box control section for controlling the temporary storage box 2. Numeral 310 denotes an acceptance box control section for controlling withdrawal of bills accepted in the pertinent acceptance box and controlling the bill acceptance boxes 5, 6 and 7, which accept bills of pertinent kinds. Numeral 311 denotes a deposit box control section for controlling the deposit box 4, which accepts reject bills and deposit bills having no pertinent acceptance boxes 5 to 7. Numeral 312 denotes a bill number update management section for updating the number of bills in each transport destination on the basis of information supplied from the transport destination control section 306. Numeral 313 denotes a main control section for controlling respective regions of the bill handling apparatus. By the way, the main control section includes a hardware configuration such as a CPU and a memory and a software configuration of programs. The main control section is also referred to simply as control section respective sections can also be referred to as means, mechanisms and units.

Schematic operation of the bill deposit transaction in the bill handling apparatus will now be described with reference to FIGS. 1 to 3. By the way, the control section 313 takes a leading role in execution of each processing, control, transaction and operation.

The deposit transaction is executed when a user has selected a deposit transaction on an operation section (which may be a touch panel or a display) included in the automated teller machine or the user has inserted a cash card into a card mechanism. And a shutter of the deposit/withdrawal port 1 is opened, and bills are thrown into the deposit/withdrawal port 1 by the user. Thereupon, a deposit order is issued by the higher rank apparatus 301 via the higher rank line control section 302. When a predetermined time has elapsed, the shutter is closed. Upon receiving the deposit order, the main control section 313 orders the transport motor control section 303 to drive the transport paths 21 to 24 in a direction directed from the deposit/withdrawal port 1 toward the temporary storage box 2, and orders the gate control section 307 to turn off the gate 15.

The main control section 313 issues a separation order to the deposit/withdrawal port control section 308 to separate bills from the deposit/withdrawal port 1 bill by bill. Bills drawn out from the separation section 12 in the deposit/withdrawal port 1 are passed through the transport path 21. The discrimination section 3 determines whether each bill is genuine and whether a bill is damaged and discriminates the kind and transport state of the bill. The transport destination control section 306 is informed of a result of the discrimination via the main control section 313. On the basis of the discrimination results, the transport destination control section 306 determines transport destinations, such as the deposit/withdrawal port 1 for reject bills and the temporary storage box 2 for normal bills.

On the basis of the determined transport destination, the main control section 313 issues an on/off order of the gates 13 and 14 to the gate control section 307 in accordance with the bill transport sequence. In the case of normal bills, the main control section 313 orders the temporary storage box control section 309 to temporarily store the normal bills passed through the transport paths 24 and 23 in the temporary storage box 2.

On the other hand, reject bills judged to be rejected in the discrimination section 3 are passed through the transport paths 24 and 22 and stacked behind the partition plate 25 in the deposit/withdrawal port 1 in order. If all bills set in the deposit/withdrawal port 1 have been classified into normal bills and reject bills, then the main control section 313 orders the transport motor control section 303 to stop the transport paths 21 to 24, and reports the completion of the deposit count to the higher rank apparatus 301 via the higher rank line control section 302. The result of the deposit count is displayed on the above-described operation section, and consequently the user can know the number of deposited bills and the amount of money. If there are bills in the deposit/withdrawal port 1, then the bills must be returned to the user, and consequently the main control section 313 orders the deposit/withdrawal port control section 308 to open the shutter in the deposit/withdrawal port 1. Furthermore, the main control section 313 orders the temporary storage box 2 to accept the wound bills.

The processing heretofore described is referred to as deposit count processing as well. In short, deposited bills are counted by the discrimination section in a process of temporarily storing bills supplied from the deposit/withdrawal port in the temporary storage box. As described above, operation of storing normal bills in the temporary storage box and returning abnormal bills to the deposit/withdrawal port is conducted.

As for bills wound in the temporary storage box 2 as normal bills, an acceptance order for the bills is issued by the higher rank apparatus 301 in response to the user's confirmation operation for the count result (on the operation section). Upon receiving this acceptance order, the main control section 313 orders the propagation path motor control section 303 to drive the propagation paths from the temporary storage box 2 in the direction of the deposit box 4 and the acceptance boxes 5, 6 and 7. As a result, the propagation paths 20 to 24 are rotated. In addition, the main control section 313 orders the acceptance box control section 310 and the deposit box control section 311 to prepare for stacking.

Subsequently, the main control section 313 issues gate on/off orders of the gates 13, 14, 15 and 19 to the gate control section 309, and orders the temporary storage box control section 309 to rewind bills wound in the temporary storage box 2 to transport the bills on the transport path 23 one after another. The bills rewound from the temporary storage box 2 are passed through the transport paths 23 and 24 and transported to the discrimination section 3. The discrimination section 3 determines whether each bill is genuine and whether a bill is damaged and discriminates the kind and transport state of the bill. The transport destination control section 306 is informed of a result of the discrimination via the main control section 313.

If the discrimination result is a reject bill, then the transport destination control section 306 determines its acceptance destination to be the deposit box 4, which is the acceptance destination of reject bills. If the discrimination result is a normal bill, then the transport destination control section 306 determines whether the bill coincides in bill kind with the acceptance box 5, the acceptance box 6 or the acceptance box 7. If the bill kind coincides, then the transport destination control section 306 determines the acceptance destination to be the acceptance box 5, the acceptance box 6 or the acceptance box 7, which is the acceptance destination of each bill kind. If the bill kind does not coincide, then the transport destination control section 306 determines the transport destination of the bill to be the deposit box 4, which is the acceptance destination of bills other than the pertinent bill kind.

On the basis of the transport destination thus determined, the main control section 313 orders the gate control section 307 to switch the gates 16, 17 and 18 in accordance with the bill transport sequence. In order to accept bills in the acceptance box 5, 6 or 7, which is the acceptance destination of the subject bill, or in the stack section 202 in the deposit box 4 one after another, the main control section 313 orders the acceptance box control section 310 and the deposit box control section 311 to rotate the sheet rollers 8, 9, 10 and 11. After all bills have been accepted, the main control section 313 orders the acceptance box control section 310 and the deposit box control section 311 to conduct post-stack processing. In this post-stack processing, bills stacked in the stack section 202 in the deposit box 4 as shown in FIG. 2A are moved to the acceptance section 203 by activating the pusher 205, and it becomes possible to stack the next bills.

After the post-stack processing has been finished, the main control section 313 orders the transport path motor control section 303 to stop the transport paths 20 to 24. Thereafter, the completion of the deposit acceptance is reported to the higher rank apparatus 301 via the higher rank line control section 302.

The processing heretofore described is called deposit acceptance as well. In short, the deposit acceptance means operation of discriminating bills accepted in the temporary storage box by using the discrimination section and accepting bills in respective acceptance boxes according to the discrimination result. Reject bills rejected by the discrimination section at the time of deposit acceptance will now be described. Reject bills are bills deposit of which from a user is allowed, but which are not suitable for withdrawal. For example, when 10,000-yen bills are assigned to the acceptance boxes 5 and 6 shown in FIG. 1 and 1,000-yen bills are assigned to the acceptance box 7, a 2,000-yen bill or a 5,000-yen bill might be deposited. In this case, the 2,000-yen bill or 5,000-yen bill becomes a reject bill. Although the state of bills is good until the bills are transported to the temporary storage box, a folded bill or two bills overlapped each other looking like one bill might be discriminated by the discrimination section. In this case, the folded bill or each of the two bills overlapped each other becomes a reject bill. If a bill having a tear is judged in deposit count processing that deposit is possible, but the bill is not suitable for withdrawal, and judged in deposit acceptance to be impossible, then the bill becomes a reject bill. Bills accepted in the deposit box 4 are not limited to the reject bills. If bills are withdrawn in the deposit/withdrawal port 1 because of a withdrawal transaction or the like, but the user forgets to take out the bills, then the forgotten bills are also accepted in the deposit box 4.

Figure 4:
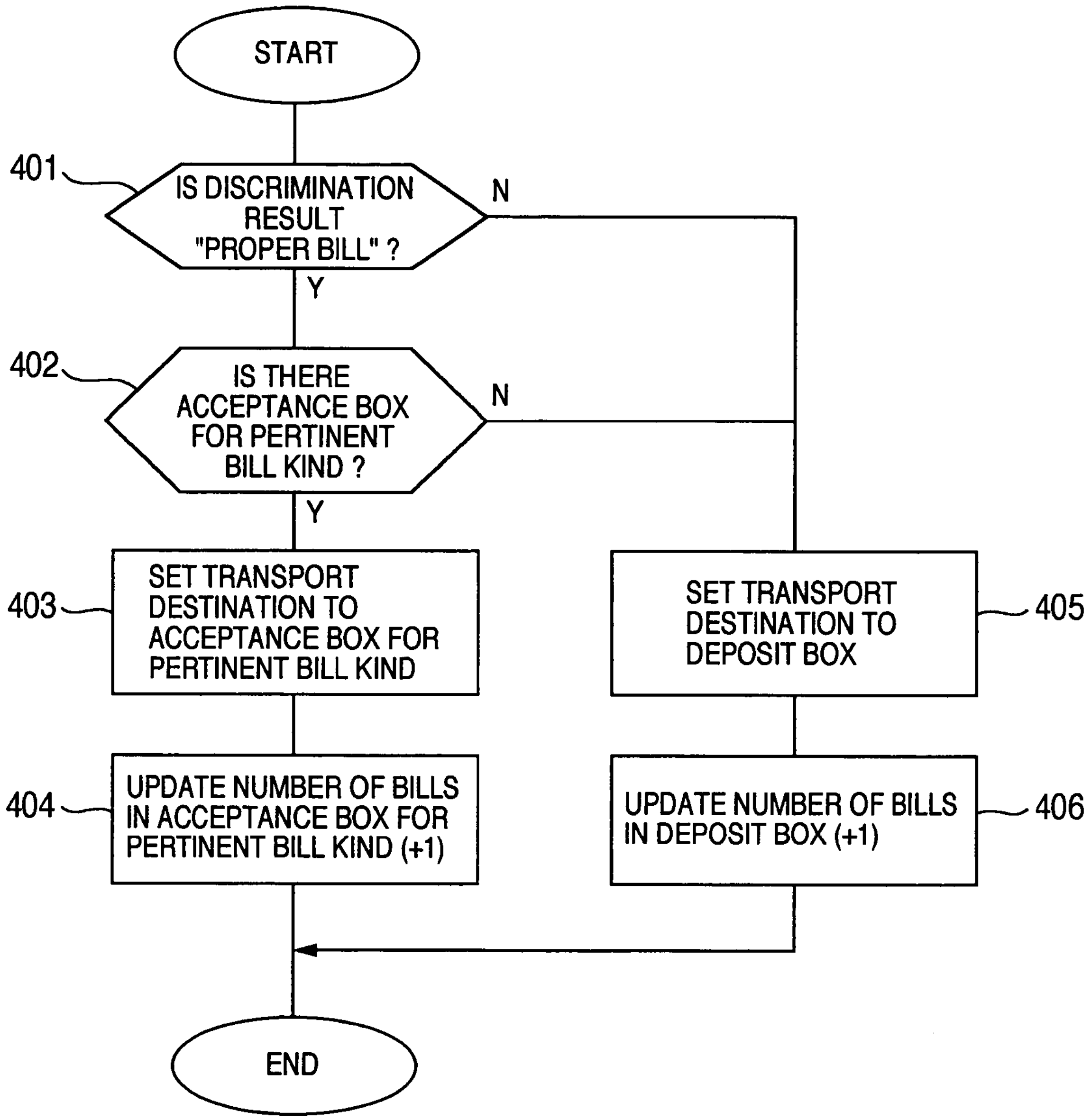
FIG. 4 is a flow chart showing processing of updating the number of bills for each stack destination.
Figure 5:
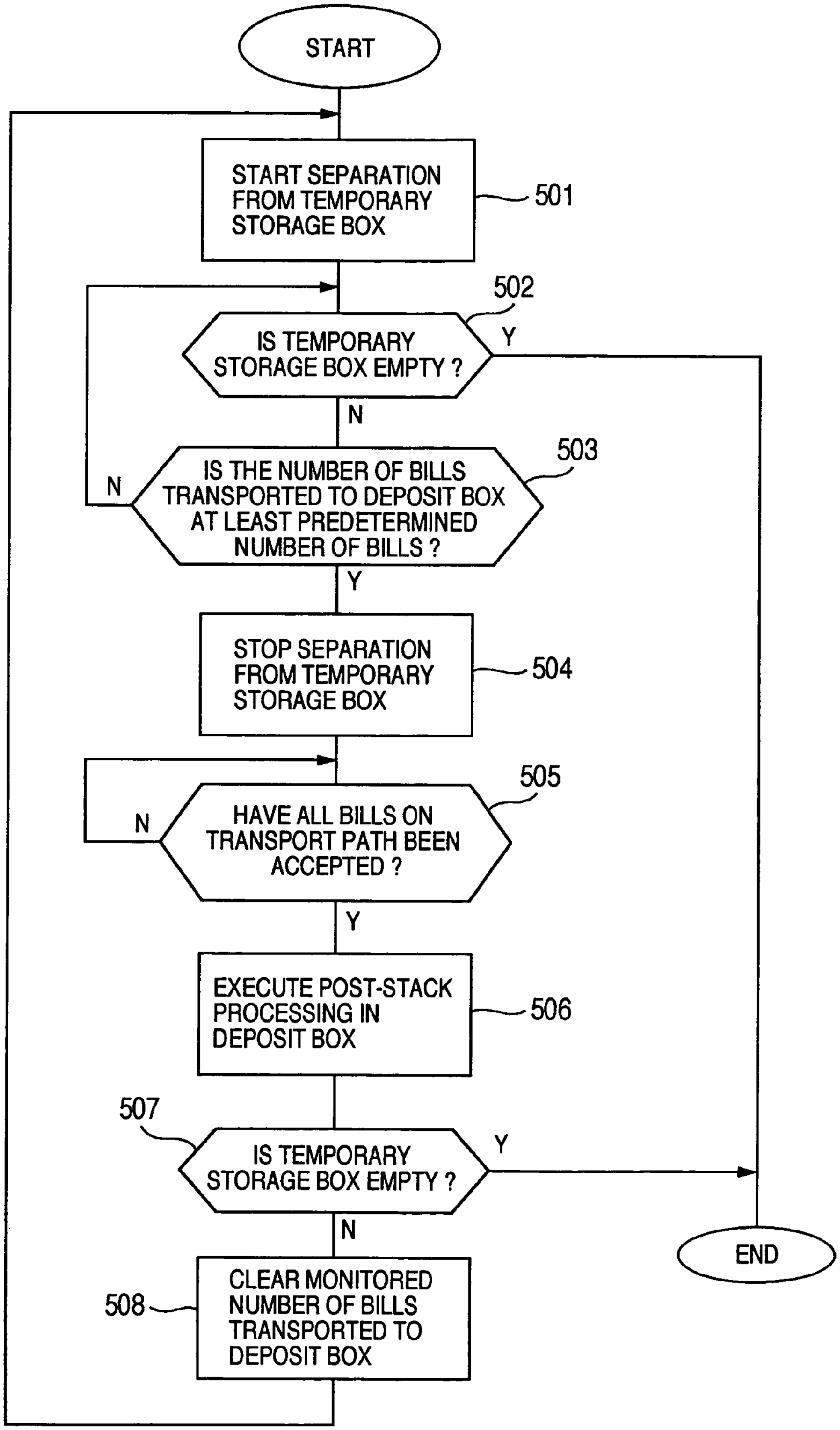
FIG. 5 is a flow chart showing operation conducted at the time of deposit acceptance using deposit boxes.

In the bill handling apparatus of the present invention, it is desirable to constitute the temporary storage box 2 and the acceptance boxes 5 to 7 so as to be able to handle a large number of bills in one transition, specifically so as to be able to conduct deposit and withdrawal transitions on 200 or more bills, from the viewpoint of making transactions efficient. On the other hand, as for the stack section 202 in the deposit box 4, if a wide space is secured, then a jam between bills occurs as described above. Therefore, a space in a certain predetermined range is desirable for the stack section 202 in the deposit box 4. By using concrete numerical values as the number of bills, therefore, operation of the bill handling apparatus will now be described by using FIGS. 4 and 5 while referring to FIGS. 1 to 3. Although numerical values are not restrictive, the number of bills accepted in the temporary storage box is greater than the number of bills accepted in the stack section. In the ensuing description, it is supposed that the maximum number of bills wound in the temporary storage box 2 is 200 and the maximum number of bills which can be stacked in the stack section in the deposit box 4 is 100. By the way, it is supposed that the acceptance box 5, the acceptance box 6 and the acceptance box 7 are used as the 10,000-yen box, 1,000-yen box and 5,000-yen box, respectively.

A user throws bills into the deposit/withdrawal port 1. It is supposed that the items of the bills are one 10,000-yen bill, one 1,000-yen bill and one hundred and fifty 2,000-yen bills. Kinds and the number of bills are judged in the deposit count processing by the discrimination section 3. If all bills are normal, then the deposited bills are wound in the temporary storage box 2 of winding type, and temporarily stored. If counts are correct and the user conducts confirmation on the operation section or the like, then the operation of accepting deposit bills from the temporary storage box 2 in the deposit box 4 and the acceptance boxes 5, 6 and 7 is executed. Separation from the temporary storage box is started (step 501), and bills are rewound onto the transport path one after another. The transported bill is discriminated by the discrimination section 3 again. The transport destination control section 306 is notified of a result of the discrimination via the main control section 313.

The transport destination control section 306 determines whether the result of the discrimination is "proper bill" (step 401). If the bill is not a proper bill, then its transport destination is set to the deposit box 4 (step 405). The number of bills in the deposit box is updated by the bill number update management section 312 (step 406). If the discrimination result is "proper bill," then it is determined whether there is an acceptance box for the pertinent bill kind (step 402). In this case, there are the 10,000-yen box 5, the 1,000-yen box 6 and the 5,000-yen box 7. As for the 10,000-yen bill and the 1,000-yen bill, there are acceptance boxes for the pertinent bill kinds, and consequently the transport destinations are set to the acceptance boxes for the pertinent bill kinds (step 403). In other words, the transport destination of the 10,000-yen bill is set to the acceptance box 5, and the transport destination of the 1,000-yen bill is set to the acceptance box 6.

Thereafter, the number of bills in the acceptance box for the pertinent bill kind is updated by the bill number update management section 312 (step 404). As for the 2,000-yen bills, a 2,000-yen acceptance box is not present in the decision whether there is an acceptance box for the pertinent bill kind (the step 402), and consequently the transport destination is set to the deposit box 4 (the step 405) and the number of bills in the deposit box is updated (the step 406).

As for bills rewound from the temporary storage box 2, it is determined whether the temporary storage box 2 is empty (step 502). If the temporary storage box 2 is empty, the operation is finished. If the temporary storage box 2 is not empty, then it is determined whether the number of bills in the deposit box updated by the bill number update management section 312 (step 406) is at least a predetermined number of bills (step 503). (In this case, the updated number of bills in the deposit box becomes the maximum number of stack bills in the stack section 202.) If the updated number of bills in the deposit box is the predetermined number of bills or less, then the operation is repeated until the temporary storage box 2 becomes empty (step 502). By the way, it is desirable to previously store the predetermined number of bills in the control section 313. However, a clerk in charge who is not illustrated may suitably set and change on the operation section for the clerk in charge.

If the updated number of bills in the deposit box is at least the predetermined number of bills, then bill separation from the temporary storage box 2 is temporarily stopped (step 504), and acceptance of all bills on the transport path is waited for (step 505). After all bills on the transport path have been accepted, the post-stack processing in the deposit box described with reference to FIG. 2 is executed (step 506). As a result, bills in the stack section 202 are pushed into the acceptance section 203 (208 in FIG. 2), and a stackable state is brought about again (209). The maximum number of stack bills in the stack section 202 is determined by considering that several bills on the transport path are stacked.

After the post-stack processing in the deposit box 4 (step 506), it is determined whether the temporary storage box 2 is empty (step 507). If the temporary storage box 2 is empty, then the acceptance operation is finished. If the temporary storage box 2 is not empty, then the monitored number of bills transported to the deposit box 4 is cleared in order to conduct monitoring again until the number of bills stacked in the deposit box 4 becomes the specified number of bills (step 508). After the clearing, bill separation from the temporary storage box 2 is started again (step 501).

By thus repeating the steps 501 to 508, it is possible to increase the number of bills which can be deposited, irrespective of a limit in the maximum number of stack bills in the stack section 202 in the deposit box 4. Even when a large number of bills are forgotten in the case of forgotten bill recovery or the like, therefore, it can be coped with by accepting the forgotten bills in an acceptance box equivalent to the deposit box 4. In other words, in forgotten bill recovery processing of recovering bills forgotten in the deposit/withdrawal port 1, the number of bills transported to the deposit box 4 is previously stored in the discrimination section 3 in the same way as the foregoing description. If the stored number of bills is at least a predetermined number of bills, then the transport of bills from the deposit/withdrawal port 1 to the deposit box 4 is stopped. (At this time, bill separation is also stopped). A space in the stack section 202 in the deposit box 4 is secured as stack processing (see FIG. 2). Then bill separation from the deposit/withdrawal port 1 is resumed again.

In the above-described example, the number of 2,000-yen bills is large and consequently 2,000-yen bills are transported to the deposit box. However, it is a matter of course that the present invention can also be applied to the case where a large number of 10,000-yen bills or 1,000-yen bills are deposited and they are regarded as reject bills and transported to the deposit box.

Figure 6:
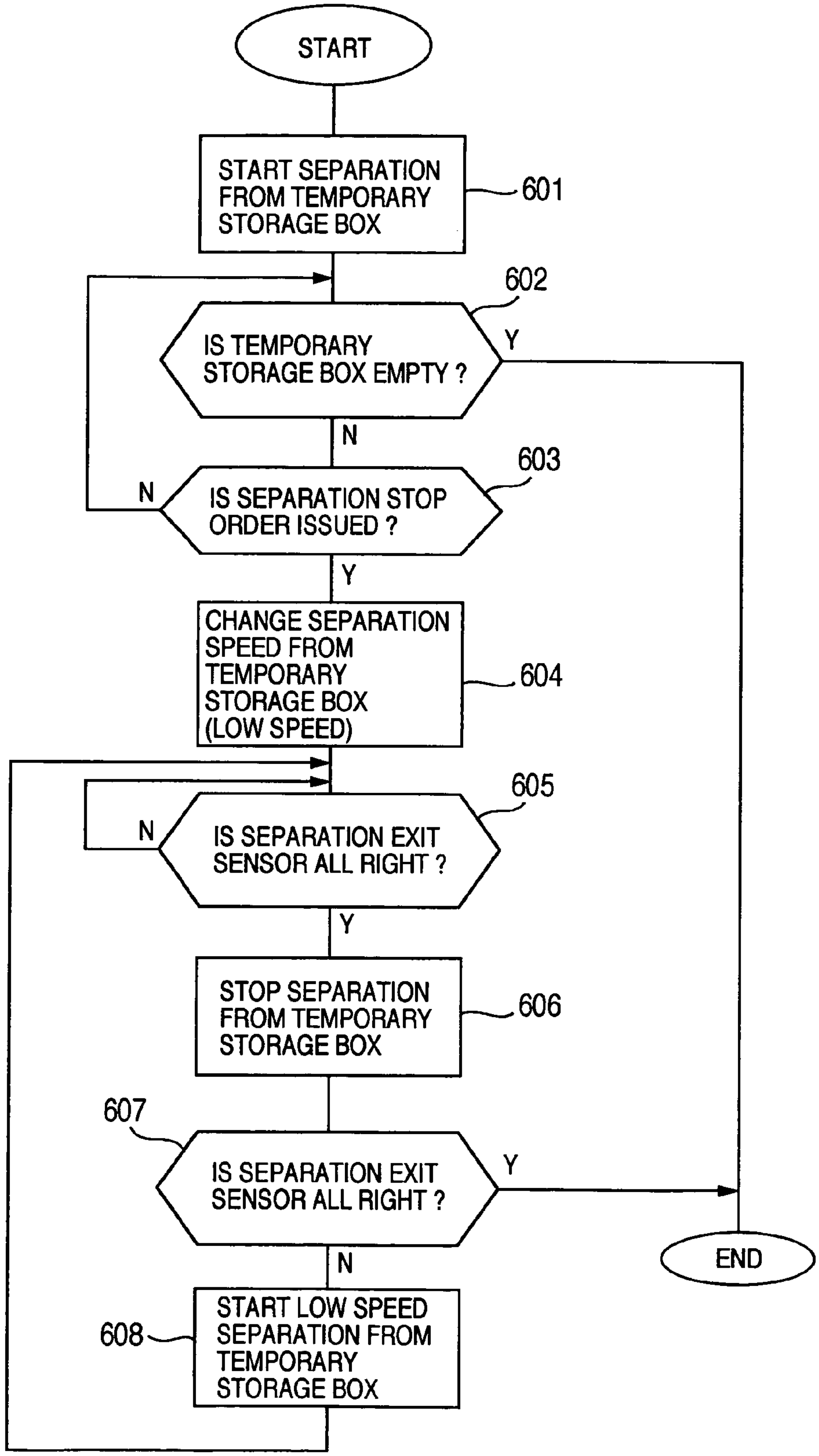
FIG. 6 is a flow chart showing stop control for a winding temporary storage box.

The stop control for operation of the bill separation from the temporary storage box 2 will now be described by using FIG. 6 while referring to FIGS. 1 to 3 and 5.

In the case where bill separation from the temporary storage box 2 is started (step 501) (step 601), the bill separation from the temporary storage box 2 is continued until the temporary storage box 2 becomes empty (step 502) (step 602) or a separation stop order is issued (step 603).

If a separation stop order is issued in the middle of bill rewinding (step 603), then the speed of bill separation from the temporary storage box is changed to a low speed (step 604). Thereafter, a separation exit sensor 26 for the temporary storage box 2 is monitored to wait for a bill to pass through the separation exit sensor 26, i.e., to wait until the separation exit sensor 26 becomes all right (step 605). If it is detected that the separation exit sensor 26 is all right (if a bill has passed through the separation exit sensor 26), then the bill separation from the temporary storage box 2 is stopped (step 606). After the stop, the separation exit sensor 26 is checked (step 607). If the separation exit sensor 26 is dark, then bill separation from the temporary storage box 2 at low speed is conducted again (step 608). If the separation exit sensor 26 is all right, then the control is finished. It is a matter of course that dark sensor detection indicates presence of a bill at the sensor whereas all right sensor detection indicates absence of a bill at the sensor.

In this way, the bill winding type is adopted as the temporary storage box installed within the bill handling apparatus. By setting the speed control of the temporary storage box to the low speed, it becomes possible to immediately change the bill separation state over to the stop state. In addition, the quantity of bills transported during the stop processing is reduced, and bill separation can be stopped without reaching the separation exit sensor 26. As a result, stopping and re-separation become possible without reaching the sensor, and false jam detection can be prevented from being caused by false detection of the sensor change. By the way, considering the length of the transport path between the temporary storage box 2 and the deposit box 4, bills (which are being transported) are present in the transport path as well. If the stack section 202 in the deposit box 4 has a capacity of 100 bills, then the bill separation operation from the temporary storage box 2 is stopped, when approximately 95 bills (a specified number of bills), which is slightly less than 100, is reached. Or, on the contrary, it is also possible to set the specified number of bills to 100 and set the allowed quantity of the stack section 202 to a value slightly greater than 100.

Furthermore, this stop control can also be applied to all sensors on the transport path. As a result, stop and restart in the middle of the transport become possible.

If external shapes of the deposit box 4 and the acceptance boxes 5 to 7 are made nearly the same, they can be exchanged. For example, the bill handling apparatus according to the present invention is changed to a dedicated deposit apparatus by replacing each of the acceptance boxes 5 to 7 shown in FIG. 1 by the deposit box 4. In this case as well, the above-described temporary stop control and speed change control for the temporary storage box become effective.

As for the temporary storage box, a temporary storage box of winding type by which bills are wound as in the above-described example is desirable, but the temporary storage box is not restricted thereto.

The present invention brings about an effect that the number of deposit bills in a transaction can be increased even in an apparatus having an inexpensive and simple deposit box.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A bill handling apparatus for handling bills, comprising:

- a deposit/withdrawal port for depositing/withdrawing bills;
- a discrimination section for discriminating bills;
- a temporary storage box for temporarily storing bills;
- a plurality of acceptance boxes for accepting bills to be withdrawn or deposited bills;
- a deposit box for accepting reject bills rejected by said discrimination section;
- counting means for counting bills transported to said deposit box when accepting bills deposited from said deposit/withdrawal port; and
- stop means for temporarily stopping operation of accepting bills from said temporary storage box into said deposit box when the number of bills counted by said counting means has become at least a predetermined value and prior to said deposit box becoming full;
- resuming means for resuming said operation of accepting bills from said temporary storage box into said deposit box, which is temporarily stopped by said stop means on the basis of a status of said deposit box.

2. The bill handling apparatus according to claim 1, wherein said temporary storage box comprises a temporary storage box of winding type for winding bills transported from said deposit/withdrawal port.

3. The bill handling apparatus according to claim 1, wherein the predetermined value is a value predetermined on the basis of an allowed quantity for the number of bills in a stack section formed within said deposit box.

4. The bill handling apparatus according to claim 1, further comprising alteration means for altering a bill separation speed from said temporary storage box when stopping bill separation operation from said temporary storage box by using said stop means.

5. The bill handling apparatus according to claim 1, further comprising monitoring means for monitoring bill separation operation from said temporary storage box by using a sensor disposed near said temporary storage box.

6. A bill handling apparatus for handling bills, comprising:

- a deposit/withdrawal port for depositing/withdrawing bills;
- a discrimination section for discriminating bills;
- a deposit box for accepting reject bills rejected by said discrimination section;
- stop means for temporarily stopping operation of accepting bills from said temporary storage box into said deposit box, when the number of bills rejected by said discrimination section has become at least a predetermined value and prior to said deposit box becoming full, in accepting bills rejected by said discrimination section; and
- resuming means for resuming said operation of accepting bills from said deposit/withdrawal port into said deposit box, which is temporarily stopped by said stop means on the basis of a status of said deposit box.

7. A bill handling apparatus for handling bills, comprising:

a deposit port for depositing bills;

a disriminating section for discriminating bills;

a temporary storage box for temporarily storing bills;

an acceptance box having an inside divided into a stack section for accepting bills that are being accepted and an acceptance section for accepting already accepted bills;

a deposit box for accepting reject bills rejected by said discrimination section; and a control section for stopping a bill separation operation conducted by said temporary storage box, when a count in said discriminating section of reject bills transported into said deposit box has become at least a predetermined value and prior to said deposit box becoming full, in accepting bills from said temporary storage box into said acceptance box;

wherein said control section resumes said stopped separation operation of said temporary storage box, and store remaining bills temporarily stored in said temporary storage box into said stack section of said deposit box, after storing bills of said stack section in said acceptance box into said acceptance section.

8. The bill handling apparatus according to claim 7, wherein the predetermined value is a value predetermined on the basis of an allowed number of bills accepted in said stack section.

9. The bill handling apparatus according to claim 7, further comprising:

a sensor for detecting a bill separated from said temporary storage box, wherein said control section controls a speed of the bill separation operation conducted by said temporary storage box, on the basis of a detection result supplied from said sensor.

10. The bill handling apparatus according to claim 7, wherein when accepting bills forgotten in said deposit port into said stack section, said control section stops operation of accepting bills from said deposit port, on the basis of the number of forgotten bills.

11. A bill handling apparatus for handling bills, comprising:

a deposit section for taking bills into the apparatus;

a discrimination section for discriminating bills;

a temporary storage section for temporarily storing bills;

acceptance sections for accepting bills; a deposit box for accepting reject bills rejected by said discrimination section; and a control section for controlling respective sections, wherein said control section comprises a deposit count function of counting bills transported from said deposit section by using said discrimination section and then accepting the bills into said temporary storage section, a deposit acceptance function of passing the bills accepted in said temporary storage section through said discrimination section and then accepting the bills into said acceptance sections, and a stop function of temporarily stopping bill separation conducted by said temporary storage section, on the basis of a result of counting conducted by said discrimination section of reject bills transported into said deposit box, in processing of the deposit acceptance function and prior to said deposit box becoming full, and a resuming function of resuming said separation of said temporary storage section which is temporarily stopped by using said stop function on the basis of status of said acceptance section.

12. The bill handling apparatus according to claim 11, wherein said control section executes the stop function when the result of counting conducted by said discrimination section has become at least a predetermined value.

13. The bill handling apparatus according to claim 11, wherein said acceptance section is divided into a stack section for storing bills that are being accepted and an acceptance section for storing already accepted bills, and said control section stops said temporary storage section by using said stop function, and then accepts bills from said stack section into said acceptance section.

14. The bill handling apparatus according to claim 13, wherein said temporary storage section is greater in maximum capacity represented by a number of acceptable bills than said stack section in said acceptance section.

* * * * *